Patented Jan. 4, 1938

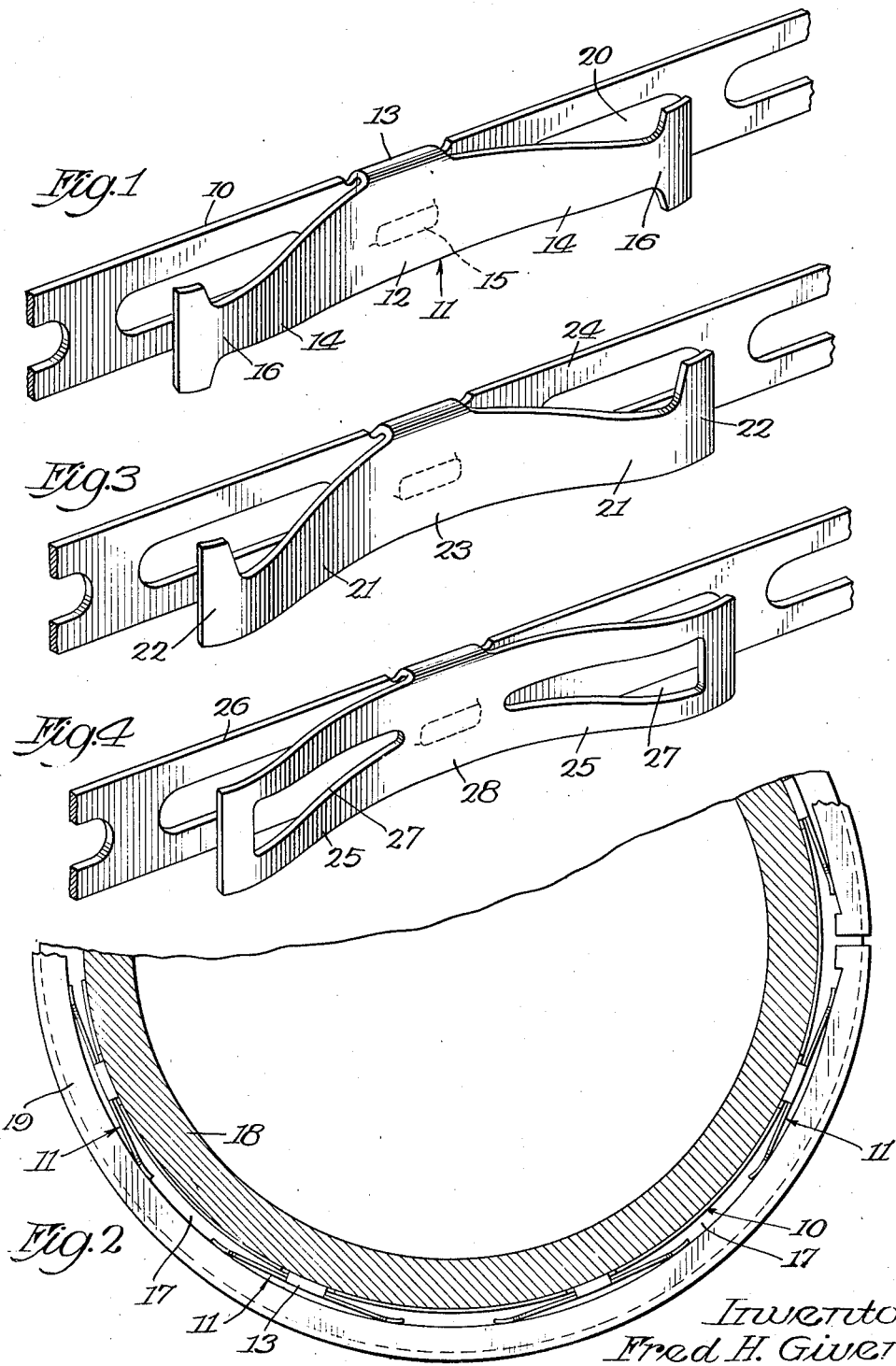

2,104,225

UNITED STATES PATENT OFFICE 2,104,225

PISTON RING EXPANDER

Fred H. Given, Hagerstown, Ind., assignor to The Perfect Circle Company, Hagerstown, Ind., a corporation of Indiana Application September 23, 1935, Serial No. 41,743

REISSUED
SEP 10 1940

5 Claims. (Cl. 309—43)

My invention relates to piston ring expanders for internal combustion engines and the like, and it has to do more particularly with expanders of a type embodying a supporting band adapted to be mounted in a piston ring groove and carrying a plurality of spring members arranged to expandingly engage the piston ring.

One of the objects of my invention is to provide an improved piston ring expander of the foregoing character which is simple in construction, is easy to install, and which is highly efficient and durable in use.

Another object is to provide a piston ring expander wherein the spring members include spring arms constructed and arranged to flex uniformly throughout their length thereby insuring longer spring life and a uniform ring-expanding action.

A more specific object is to provide a piston ring expander of the foregoing character wherein the spring arms are each supported at one end with the other end free and adapted to engage the piston ring, the ends of the spring arms being of substantially the width of the supporting band with the intermediate portions of the arms reducing in section from their supported ends toward their free ends.

Other objects and advantages will become apparent as this description progresses and by reference to the drawing, wherein,—

Figure 1 is a fragmentary perspective view of one form of piston ring expander embodying my invention;

Fig. 2 is a sectional plan view of a piston showing the expander in position behind a piston ring;

Fig. 3 is a fragmentary perspective view of another form of piston ring expander embodying my invention; and Fig. 4 is a view similar to Figs. 1 and 3 illustrating still another form of expander embodying my invention.

The expander shown in Fig. 1 includes a supporting band 10 and a plurality of spring members 11 which may be integrally cut and formed from a sheet or ribbon of soft steel and thereafter heat-treated and tempered so that they become hard and resilient and have the characteristics of spring steel. The material from which the expander is formed may vary in thickness, for example, from .005" to .020", and the band is of a width approximately equal to the width of the ring groove in which it is to be mounted. The length of the band is slightly less than the circumference of the bottom of the ring groove.

The spring members 11 are constructed and arranged to overlie the band 10 in spaced relation. Each spring member includes an intermediate portion 12 of substantially the same width as the band 10, the same being connected to the band by a neck 13. The intermediate portion 12 of the spring member supports spring arms 14 which extend in opposite directions in substantially parallel relation to the band. The supporting band 10, immediately back of the intermediate portion 12 of each spring member, is provided with an embossment 15 which holds the spring member in spaced relation and supports the intermediate portion 12 of the spring member for the flexing action of the spring arms 14.

The spring arms 14 are so constructed that, when they are assembled in operative relation to a piston ring, they will flex uniformly throughout their length from the intermediate portion of the spring members 12 toward the outer ends of the arms, thereby avoiding constant flexing and bending strains and stresses at any one point therein and insuring longer spring life. This action is accomplished by shaping the spring arms so that they taper inwardly along both edges thereof from the intermediate portion of the spring member toward the outer end thereof, thereby gradually and uniformly reducing the section of the arms toward their outer ends. By thus reducing the section of the arms, their flexing ability increases toward their outer ends and the arms tend to flex uniformly throughout rather than to hinge merely at the fulcrum-supporting intermediate part 12.

The extreme outer ends of the spring arms 14 are formed to substantially the full width of the supporting band 10 so that the arms are substantially T-shaped. This construction permits engagement of the ends of the arms substantially across the inner surface of the piston ring, thus reducing wear, minimizing cutting or "scuffing" of the ring, and avoiding any tendency of a spring arm 14 to cause the ring to tilt or "cock" in the piston groove.

As shown in Fig. 2, the expander may be mounted in a ring groove 17 of a piston 18. It will be seen that the expander seats snugly against the bottom of the ring groove and that the ring contacting points 16 of the spring arms 14 engage the rear or inner surface of the piston ring 19. Each spring member 11 operates independently of the other spring members, with the arms thereof freely engaging the inner surface of the ring with a minimum of friction; and, in this manner, the desired pressure characteristics of the ring and the proper contact between the ring and the cylinder bore are assured. The ring expander may be used in connection with a ventilated oil ring and, in that case, the supporting band is provided with suitably located slots 20 for draining oil back into the crank case of the engine.

Other expander structures embodying my invention are shown in Figs. 3 and 4. The expander of Fig. 3 is similar to that previously described except that spring arms 21 are L-shaped, providing outer end portions 22 of substantially the width of the supporting band 24 to avoid the tendency of such arms to dig into the piston ring. Also in this form (Fig. 3) the intermediate portion 23 of the spring member is of substantially the width of the supporting band 24 and the upper edges of the intermediate portions of the spring arms 21 are tapered to reduce the section of such arms from the intermediate portion 23 to the outer end 22 thereof.

In the form shown in Fig. 4, the spring arms 25, throughout their length, are of substantially the width of the supporting band 26, and the section of these arms is reduced by providing in each thereof a slot 27. The slot 27 is of greater width at the outer free end of the spring arm 25 and reduces in width toward the intermediate portion 28 of the spring member. Otherwise, this form is the same as the forms previously described.

It will be understood that, although I have described several forms of my invention, other changes in details and arrangements of parts may be resorted to without departing from the spirit and scope of my invention as defined by the claims that follow.

I claim:

1. A piston ring expander adapted to be mounted in a piston ring groove behind a piston ring comprising a supporting band adapted to seat in the piston ring groove, a plurality of spring members carried by said band and each having an intermediate portion of the width of said band and having spring arms extending from the opposite ends of said intermediate portion and overlying the outer face of said band in spaced relation thereto, said spring arms being T-shaped and having their T-heads free and adapted to frictionally engage the inner surface of the piston ring, and the T-stem portion of said arms adjacent the T-head thereof being of less width than said band and gradually and uniformly increasing in width away from said T-head to said intermediate portion.

2. An integral piston ring expander comprising a supporting band, a plurality of spring members carrier by said band, each said spring member including an intermediate portion of substantial length carried by said band and spring arms carried by and extending from opposite ends of said intermediate portion in overlying and spaced relation to said band, a neck portion extending throughout the length of said intermediate portion and connected to the adjacent edge of said band; said arms being so constructed that their opposite side edges taper gradually and uniformly outward and inward from said intermediate portion to the outer ends of said arms and the outer ends of said arms are substantially the same width as said intermediate portion and band.

3. A piston ring expander comprising a supporting band, a plurality of spring members carried by said band and having an intermediate portion of substantial length and substantially the width of said band and spring arms extending from the opposite ends of said intermediate portion and overlying the outer face of said band in spaced relation thereto, said spring arms being substantially L-shaped with the upper edges thereof tapering inwardly from said intermediate portion toward but short of their outer ends which are of substantially the same width as said band, the lower edges of said arms extending along in substantially edge alignment with the lower edge of said band.

4. A piston ring expander comprising a supporting band, a plurality of spring members carried by said band and having spring arms overlying the outer face of said band in spaced relation thereto, said spring arms being of substantially the same width throughout with the opposite side edges thereof substantially aligned with the opposite side edges of said band, and each of said arms having a longitudinal slot therein extending from near one end thereof to near the other end thereof and which decreases in width from the outer end of said arm toward its other end to reduce the cross-sectional area of the material of each arm toward its outer end.

5. An integral piston ring expander which includes a supporting band adapted to be mounted in a piston ring groove behind a piston ring therein, a spring member having an intermediate portion of substantial length and of a width throughout substantially equal to the width of said band, a neck portion extending substantially the length of said intermediate portion and supporting the latter from one edge of said band, similarly-shaped spring arms carried by and extending from the opposite ends of said intermediate portion in overlying spaced relation to the outer face of said band, said spring arms being so shaped that their outer ends are of substantially the width of said band, neck and intermediate portion, and the cross-sectional area of each said arm is gradually and uniformly reduced from said intermediate portion to the outer end thereof.

FRED H. GIVEN.